US007873976B2

(12) United States Patent
Vitenberg

(10) Patent No.: US 7,873,976 B2
(45) Date of Patent: Jan. 18, 2011

(54) DIGITAL SUBSCRIBER LINE COMMUNICATION SYSTEM

(75) Inventor: Roman Vitenberg, Holon (IL)

(73) Assignee: Coppergate Communications Ltd., Tel-Aviv (IL)

( * ) Notice: Subject to any disclaimer, the term of this patent is extended or adjusted under 35 U.S.C. 154(b) by 0 days.

(21) Appl. No.: 11/286,291

(22) Filed: Nov. 25, 2005

(65) Prior Publication Data

US 2006/0117364 A1 Jun. 1, 2006

Related U.S. Application Data

(62) Division of application No. 09/599,406, filed on Jun. 22, 2000, now abandoned.

(30) Foreign Application Priority Data

Feb. 6, 2000 (IL) ...................................... 134401
Jun. 15, 2000 (IL) ...................................... 136781

(51) Int. Cl.
*H04N 7/18* (2006.01)
(52) U.S. Cl. .................. 725/78; 725/82; 379/92.03; 379/93.07; 375/222
(58) Field of Classification Search ............. 725/78–85, 725/106–117, 131–134, 139–142; 375/139, 375/140, 220, 222, 260; 379/93.01–93.11, 379/406, 416
See application file for complete search history.

(56) References Cited

U.S. PATENT DOCUMENTS

| | | | | |
|---|---|---|---|---|
| 5,682,483 A * | 10/1997 | Wu et al. ..................... 710/300 |
| 5,898,761 A | 4/1999 | McHale et al. |
| 6,021,158 A * | 2/2000 | Schurr et al. ................. 375/211 |
| 6,151,632 A * | 11/2000 | Chaddha et al. ............. 709/231 |
| 6,192,399 B1 | 2/2001 | Goodman |
| 6,202,211 B1 | 3/2001 | Williams |
| 6,246,695 B1 * | 6/2001 | Seazholtz et al. ........... 370/468 |
| 6,252,755 B1 * | 6/2001 | Willer ........................ 361/119 |
| 6,282,189 B1 * | 8/2001 | Eames ........................ 370/352 |
| 6,317,884 B1 * | 11/2001 | Eames et al. ................ 709/217 |
| 6,452,923 B1 * | 9/2002 | Gerszberg et al. ........... 370/352 |
| 6,453,033 B1 * | 9/2002 | Little et al. .................. 379/219 |
| 6,453,040 B1 * | 9/2002 | Burke et al. ............ 379/387.01 |
| 6,483,902 B1 * | 11/2002 | Stewart et al. ........... 379/90.01 |
| 6,526,581 B1 * | 2/2003 | Edson ......................... 725/74 |
| 6,535,580 B1 * | 3/2003 | Strauss et al. ............ 379/27.01 |
| 6,690,721 B1 * | 2/2004 | Murphy et al. .............. 375/222 |
| 6,694,016 B1 * | 2/2004 | Sun et al. ............... 379/399.01 |
| 6,745,392 B1 * | 6/2004 | Basawapatna et al. ...... 725/120 |
| 6,778,646 B1 * | 8/2004 | Sun .......................... 379/93.05 |
| 6,856,682 B1 * | 2/2005 | Ham .......................... 379/372 |
| 6,868,072 B1 * | 3/2005 | Lin et al. .................... 370/276 |
| 6,928,057 B2 * | 8/2005 | Bullman et al. ............. 370/252 |
| 6,941,576 B2 * | 9/2005 | Amit .......................... 725/143 |
| 7,047,313 B1 * | 5/2006 | Broerman .................... 709/238 |
| 7,293,090 B1 * | 11/2007 | Saleh et al. ................. 709/226 |
| 2002/0010818 A1 * | 1/2002 | Wei et al. ..................... 710/62 |

FOREIGN PATENT DOCUMENTS

WO    WO99/12330    3/1999

\* cited by examiner

*Primary Examiner*—Annan Q Shang
(74) *Attorney, Agent, or Firm*—AlphaPatent Associates Ltd.; Daniel J. Swirsky

(57) ABSTRACT

A digital subscriber line communication system (DCLCS) provides voice and data services to a subscriber premises within a building and to high speed data communication devices in the subscriber premises using in-building wiring and to-building wiring without having high speed communication equipment inside the subscriber premises.

11 Claims, 9 Drawing Sheets

DIGITAL SUBSCRIBER LINE COMMUNICATION SYSTEM

CROSS-REFERENCE TO RELATED APPLICATIONS

This application is a divisional application claiming benefit from U.S. patent application Ser. No. 09/599,406, filed Jun. 22, 2000, now abandoned and which claims priority from Israel Patent Application No. 134,401, filed Feb. 6, 2000, and Israel Patent Application No. 136,781, filed Jun. 15, 2000, each of which is hereby incorporated by reference.

FIELD OF THE INVENTION

The invention is generally in the field of communication and concerns a system for voice and data communication. More particularly, the present invention relates to a communication system on existing twisted pair telephone cables, utilizing digital subscriber line (DSL) technology.

BACKGROUND OF THE INVENTION

Existing plain old telephone service (POTS), based on twisted pair telephone cable, is the most widespread communication infrastructure in the world. Technologies have been developed which permit the use of existing telephone cables for the high rate data transmission characteristics of digital communication. These include the digital multitone signal technology that allows the twisted pair telephone subscriber lines to be used for multi media and high-speed data communication. Asymmetrical digital subscriber line (ADSL) allows the transmission of data with a rate exceeding 8 Mb/s to a subscriber premises, and at a rate as high as 1 Mb/s in bi-directional communication. Such rates expand existing access capacity by 50 fold or more without the need for new cabling. ADSL can transform the existing public telephone network from one limited to voice, text and lower resolution graphics to a powerful, ubiquitous system capable of bringing multimedia, including full motion video, to every home.

An ADSL circuit includes an ADSL modem on each end of a twisted pair telephone line, creating three information channels—a high speed downstream channel, a medium speed duplex channel and a POTS channel. The POTS channel is separated from digital modems by filters, thus guaranteeing uninterrupted POTS, even if ADSL fails. The high speed downstream channels support a bit rate from about 1.5 to about 8 Mb/s, while duplex channels support rates which range between 16 to 1040 Kb/s. Downstream data rates depend on a number of factors including the lengths of the copper line, the wire gauge, the presence of bridged taps and cross cable interference. Line attenuation obviously increases with line length and frequency and decreases as diameter increases. A typical ADSL line will transmit at the rate of 1.5 Mb/s, with a wire diameter of 0.5 mm, over 5.5 km and at 8 Mb/s over a distance of 3.7 km for a wire of the same diameter. For wire with a 0.4 mm diameter, the respective distances are 4.6 km and 2.7 km.

One problem of ADSL systems is the need to rewire existing telephone home networks within a subscriber premises and to place special splitter devices for separating voice and ADSL signals to a subscriber premises. In order to eliminate splitter and rewiring of home networks, a G.Lite ADSL system was developed, in which the separation between the ADSL and the voice signals is realized by means of special micro filters placed serially in the line connecting each home telephone device to the external line. However, the G.Lite system supports a bit rate of up to 1.5 Mb/s only in a downstream direction, which is too slow for a variety of applications including, in particular, video-on-demand service. Furthermore, the micro filter associated with a telephone device decreases the quality of voice communication.

In multi-apartment buildings, the telephone lines typically reach a central box and from there telephone lines extend to each of the apartments. In existing systems, such inter-building wiring is also not suitable for high-speed data communication. Typically, such inter-building wiring makes use of flat pair cables, which have unpredictable characteristics and are highly sensitive to RF noise.

Another problem of existing ADSL systems is that a customer must have an ADSL home modem and a personal computer at the subscriber premises. Every home device which requires high-speed data service from a telephone station, such as a video phone, digital TV, hi-fi digital audio, etc., must be connected to an ADSL home modem through a computer, typically a personal computer (PC). In practice, this means that a location, to make use of an ADSL system with intra-location network capability, needs two independent networks: an existing telephone network and an additional digital data network.

A further problem of ADSL systems is that only one home modem may communicate with a modem at a central office of the communication service provider at the same time. If a subscriber has several computers, only one of them may thus be connected to the telephone line.

SUMMARY OF THE PRESENT INVENTION

There is therefore provided, in accordance with the present invention, a method for communication which includes providing voice and data services to a subscriber premises within a building and to high speed data communication devices in the subscriber premises using in-building wiring and to-building wiring without having high speed communication equipment inside the subscriber premises.

Moreover, in accordance with a preferred embodiment of the present invention, the step of providing includes passing POTS related signals along the in-building wiring to and from the subscriber premises without attenuation, providing HPN signals along the in-building wiring to and from the subscriber premises, providing xDSL signals along the to-building wiring to and from a central office of a communication service provider and converting between the HPN signals and the xDSL signals.

Moreover, in accordance with a preferred embodiment of the present invention, one type of data service is downloading video films or broadcast transmitted from the CO and another is transmission of downloaded video films or broadcast to the subscriber premises.

There is also provided, in accordance with a preferred embodiment of the present invention, a communication device which includes an xDSL analog front end (AFE) module, an HPN AFE, an xDSL-to-HPN converter and a splitter isolator. The xDSL AFE is connectable to to-building wiring connected to a central office of a communication service provider. The HPN AFE is connectable to in-building wiring connected to a subscriber premises. The xDSL-to-HPN converter is connected to the xDSL AFE and the HPN AFE. The splitter-isolator is connectable between the to-building wiring and the in-building wiring and permits passage therethrough of POTS-related signals while not permitting passage therethrough of xDSL and HPN signals.

Moreover, in accordance with a preferred embodiment of the present invention, the HPN AFE is an HPNA-2 AFE, the xDSL AFE is an ADSL AFE and the xDSL-to-HPN converter is an ADSL-to-HPNA-2 converter.

Moreover, in accordance with a preferred embodiment of the present invention, the to-building wiring is twisted pair wiring.

Further, in accordance with a preferred embodiment of the present invention, the in-building wiring is flat pair wiring.

Further, in accordance with a preferred embodiment of the present invention, the HPN AFE is operative to communicate with at least one terminal device in the subscriber premises.

Moreover, in accordance with a preferred embodiment of the present invention, the terminal device may be a personal computer (PC), a video device, a television set, a videophone, an IP-phone and a HI-FI audio device.

Finally, in accordance with a preferred embodiment of the present invention, the device includes an input/output port connectable to a video server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
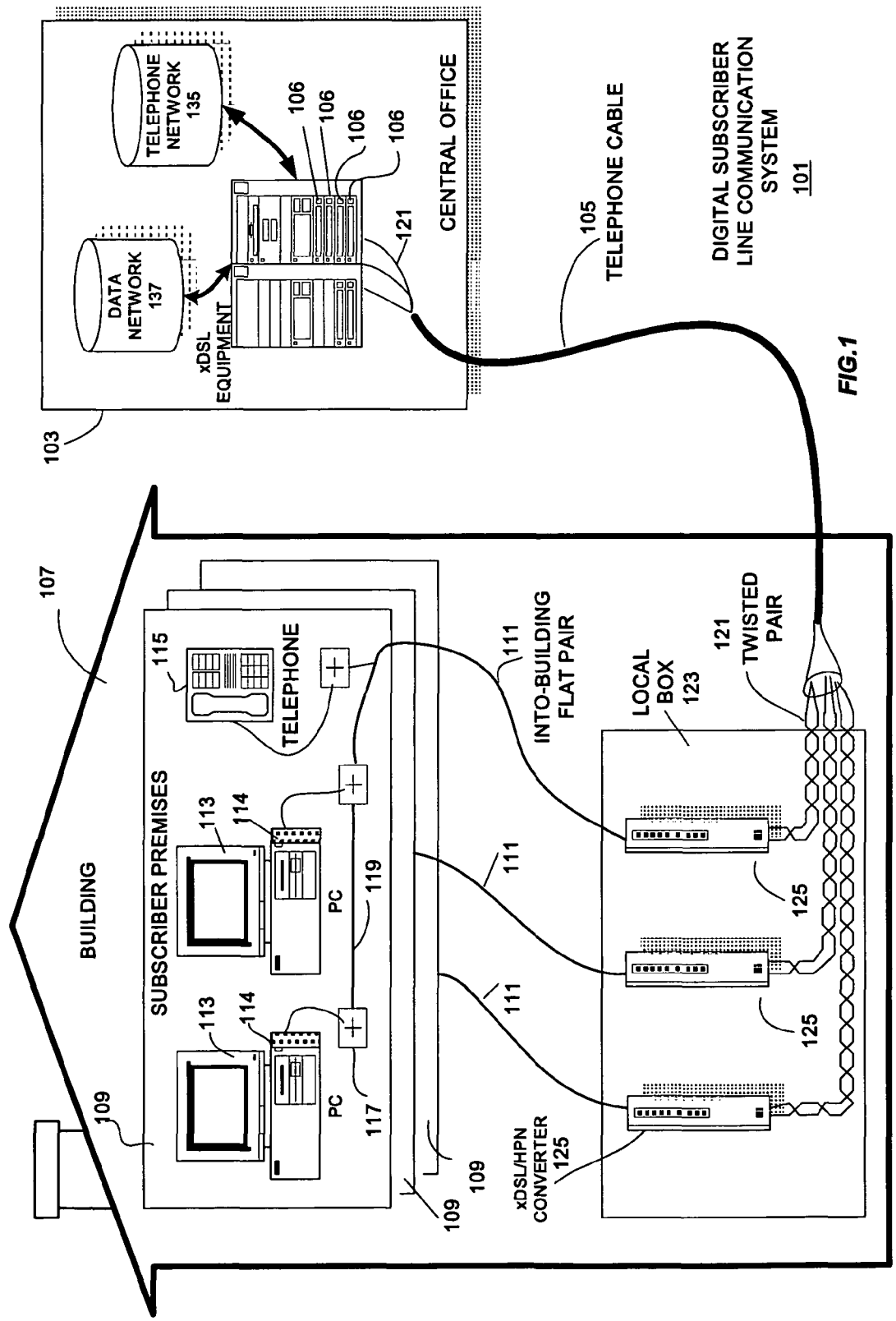
FIG. 1 is a schematic representation of an embodiment of a DSLCS of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF PREFERRED EMBODIMENTS

Reference is first being made to FIG. 1 showing a DSLCS 101 in accordance with an embodiment of the invention. The system shown in FIG. 1 comprises central office (CO) 103 of a telephone service provider, linked to a multi-apartment building 107 by twisted pair telephone cables 121, included within cable 105. CO 103 includes a plurality of xDSL office modems 106 included within the office's xDSL equipment 108 each one connected to one of twisted pair cables 121. Each xDSL modem 106 is further connected to the telephone network 135 and to data network 137 to provide POTS and data service, respectively, to the subscribers.

Building 107 includes a number of subscriber premises 109, typically each being included in a separate apartment of the building, as well as a local central communication box 123 with twisted pair cables 121 leading into box 123. Box 123 is also connected by a plurality of intra-building cables 111 to each of the subscriber premises 109, cables 111 being typically a flat pair cable (although at times it may also be a twisted pair). The subscriber premises, in accordance with this embodiment, comprises one or more telephone devices 115 (only one shown in the illustration of FIG. 1) and one or more computers, typically personal computers (PCs) 113 (two are illustrated in FIG. 1). Each of PCs 113 is connected directly to a connector 117 of the telephone line 119 through an associated or integral HPN (home phone network) interface device 114. The telephone device 115 is also connected to telephone 119 through a similar connector.

Local box 123 comprises a plurality of xDSL/HPN subscriber converters 125, one for each subscriber premises 109. Each subscriber converter is connected to and links between a twisted pair 121 and an intra-building cable 111.

Figure 2:
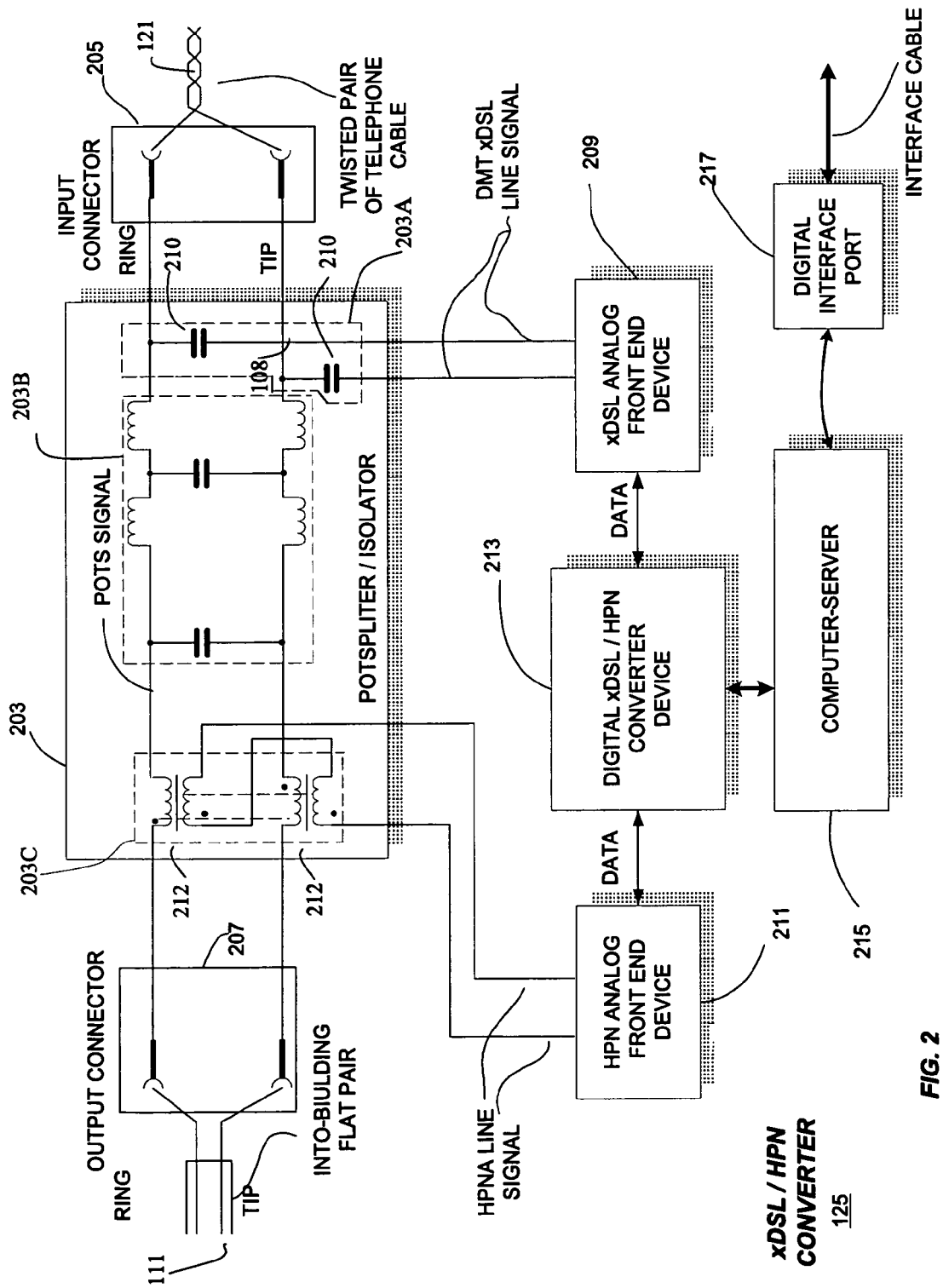
FIG. 2 is a block diagram representation of a subscriber converter in accordance with an embodiment of the invention, useful in the DSLCS of FIG. 1.

The structure of an xDSL/HPN converter 125 is shown in FIG. 2. It comprises a splitter-isolator 203, including a high-pass filter 203A, a low-pass filter 203B and an HPN line transformer 203C, linking between an input connector 205 and an output connector 207, an xDSL analog front end (AFE) module 209 coupled to input connector 205 via capacitors 210 of high-pass filter 203A, an HPN AFE module 211, coupled to output connector 207 via solenoids 212 of transformer 203C and a digital xDSL/HPN converter module 213 coupled to xDSL AFE module 209 and to HPN AFE module 211. A computer server 215 is coupled to converter module 213 and to a digital interface port 217. Input connector 205 and output connector 207 are connected, respectively, to twisted pair cable 121 and to intra-building cable 111.

Communication system 101 provides voice and digital data service to every subscriber premises 109 of building 107. Voice signals from telephone network 135 are routed through a POTS-splitter (not shown) of the CO xDSL equipment 108, into twisted pair cable 121. Data signals from data network 137 are converted to xDSL line signals by the office modem 106 and are then also routed into the same subscriber twisted pair 121. The CO may use standard xDSL equipment like ADSL or VDSL modems and may function in a similar way to that in existing ADSL or VDSL systems.

Voice signals from telephone 115 inside the subscriber premises pass through cable 111 and then through splitter isolator 203 of subscriber converter 125, without any attenuation. Data signals from PC 113 are converted to HPN line signals by the HPN interface device 114 and are then converted to ADSL line signals within the subscriber converter 125. The HPN line signals are first converted into a digital form by the HPN AFE device 211 and then pass through the digital xDSL/HPN converter module 213, which, through digital signal processing, decodes the digital data which can subsequently be stored within an internal memory of device 213. A unit within the xDSL/HPN converter module 213 reads the data, e.g. from the internal memory, and then, through digital signal processing, converts the data to discrete xDSL signals. The xDSL AFE module 209 then converts the discrete xDSL signals to analog xDSL line signals, which are then transmitted through input connector 205 and cables 121 to modems 106 of CO 103.

Computer server 215, which is optionally provided in some embodiments of the invention, can exchange data with the internal memory of the xDSL/HPN converter device 213 and may store data in its memory, which may subsequently be used by the subscriber. For example, the computer server 215 may be programmed by the customer to store and automatically update Internet pages such as news pages, sport information, business information and others. A digital interface port 217 may be used for connection of server 215 to other devices to realize various additional potential features as will be described further below.

The conversion of line xDSL signals transmitted through cable 121 from the CO to HPN, also takes place within subscriber converter 125, in a similar way, mutatis mutandis. Received xDSL signals are converted by the xDSL AFE module 209 into a discrete digital form and are then processed by the digital xDSL/HPN converter module which decodes the digital data. The digital data may be stored in the internal memory of device 213. Another unit of the xDSL/HPN converter module 213 reads the data, e.g. from the internal memory, and then, through digital signal processing, converts the data to discrete HPN signals. The HPN AFE module 209 then converts the discrete HPN signals to analog HPN line signals.

The DSLCS of the invention has several important features. For one, in installing the DSLCS there is no need to rewire existing intra-building wires as in the case of full rate ADSL and there is further, no need for micro filters like in the case of splitterless ADSL. Further, the DSLCS of the invention achieves high performance communication with the xDSL office equipment, as it uses the twisted pair telephone cables directly connected to a subscriber converter. This decreases noise and RF interference on the xDSL line, as compared to existing systems, and terminates bridged taps problems common in a splitterless ADSL.

Another important feature of the invention is that every PC in the subscriber premises may be connected to the CO at the same time, through the subscriber converter. Furthermore, any device in the subscriber premises that needs high speed data services from a communication service provider, such as video phones, digital TV, hi-fi digital audio and others, may be connected directly to existing telephone connectors inside the premises, with no need to connect such devices via a computer.

The computer server of the subscriber converter may support many different applications. For example, the computer server may, in accordance with some embodiments of the invention, replace the subscriber's PC. For this purpose, the subscriber premises may include a terminal device which may execute functions such as video phone, personal computer function, Internet connection, remote control to different home utilities, and others.

The invention may be realized both with different xDSL standards (e.g. ADSL, VDSL, SDSL, HDSL) and different HPN standards (e.g. HPNA-1, HPNA-2, NDSL).

Figure 3:
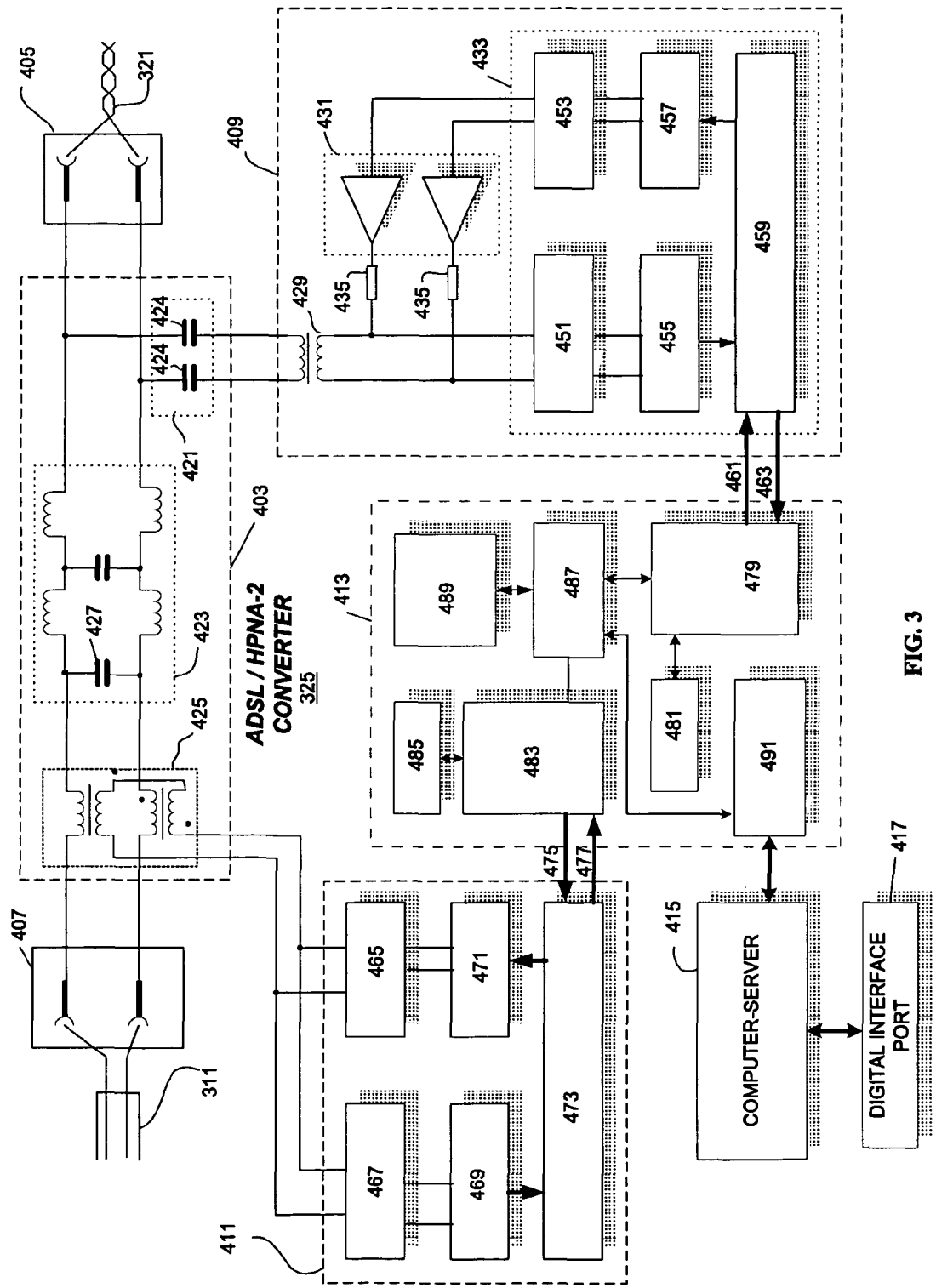
FIG. 3 is a block diagram representation of a subscriber converter in accordance with another embodiment of the invention.

Reference is now being made to FIG. 3 showing, by way of a block diagram, the structure of a subscriber converter 325 in accordance with another embodiment of the invention. This subscriber converter utilizes the ADSL DMT (Dual Multi-tone) standard for communication with the CO and the HPNA-2 standard for intra-building communication. This converter may support home network communication with a bit rate of up to 10 Mb/s, a downstream bit rate from the CO at up to 10 Mb/s (over a line having a distance of up to 3 km) and an upstream bit rate to the CO of 1 Mb/s.

Subscriber converter 325 comprises a splitter isolator 403 linking between input connector 405 and output connector 407, an ADSL AFE module 409, coupled to input converter 405, an HPNA-AFE module 411 coupled to output connector 407 and a digital ADSL/HPNA-2 converter module 413 coupled to the ADSL AFE module 409 and to the HPNA-2 AFE module 411. An optional computer server 415 is coupled to converter device 413 and to a digital interface port 417. The input connector 405 is connected to a twisted pair telephone cable 321 connected to the CO and the output connector 407 is connected to flat or twisted pair 311 of intra-building wiring.

The splitter isolator 403 comprises high-pass filter 421, a low-pass filter 423 and an HPN line transformer 425.

An input ADSL signal from the twisted pair 321 enters the ADSL AFE device 409 through high-pass filter capacitors 424. A voice signal passes through the low-pass filter 423, having a typical bandwidth of about 8 KHz. Given the fact that the frequency diapason of the voice signal is about 0.3-4 KHz, it passes through low-pass filter 423 without attenuation. Against this, ADSL line signals are allocated in a diapason of about 30 kHz-1.1 MHz. The HPNA-2 signals are allocated in a diapason of 4-10 MHz. Thus, the low-pass filter 423 has a very high attenuation for ADSL and HPNA-2 signals (about 60-80 dB) and thus provides an effective isolation of such signals between input connector 405 and output connector 407. HPNA-2 signals are routed into intra-building wiring 311 through the line transformer 425, which has a very low impedance for voice signals. An output capacitor 427 of low-pass filter 423 has a very low impedance for the HPNA-2 signals.

ADSL AFE module 409 comprises an ADSL line transformer 429, a line driver integrated circuit (IC) 431 and an ADSL AFE IC 433. Resistors 435 match the impedance of device 409 with the impedance of twisted pair 321. Line driver 433 and the ADSL AFE IC 431 may be selected from a variety of such devices known per se. ADSL AFE IC 433 comprises an analog receiver filter 451, an analog transmitter filter 453, analog-to-digital converter (ADC) 455, digital-to-analog converter (DAC) 457 and a digital parallel interface (DPI) block 459. The ADSL AFE IC 433 converts the received DMT signal to an output word and converts an input digital word into an analog DMT signal. The digital word may, for example, be a 14 bit word. Output digital words are outputted from ADSL AFE device 409 through output bus 463 and input digital words are inputted through input bus 461.

HPNA-2 AFE module 411 may be selected from a wide variety of available devices known per se. The HPNA-2 AFE module 411 comprises a line driver 465, a receiving filter 467, an ADC 469, a DAC 471 and a DPI 473. The HPNA-2 module 411 converts received QAM (Quadrature Amplitude Modulation) signals to output digital words and converts input digital words into a QAM signal. The digital words may, for example, be 12 bit digital words. The input digital word is inputted to the HPNA-2 module 411 by input bus 475 and the output digital word is outputted through output bus 477. The digital ADSL/HPNA-2 converter module 413 includes a VLSI circuit. It comprises a first DSP 479, a first program memory 481 loaded with a micro-program for the ADSL signal processing, a second DSP 483, a second program memory 485 loaded with a micro-program for the HPNA-2 signal processing, a data exchange controller 487, a buffer RAM 489 and a control processor 491. The first DSP 479 is controlled by the micro-program in first program memory 481 and is coupled to the ADSL AFE device 433 by input and output buses 461, 463. The second DSP 483 is controlled by the micro-program in second program memory 485 and is coupled to the HPNA-2 AFE module 411 by input and output buses 475, 477. Control processor 491 may be coupled to an optional server computer 415, the latter being coupled to digital interface port 417.

In operation, QAM line signals from an FPNA-2 interface module associated with a computer in the subscriber premises, are transmitted through the intra-building wiring 311 to output connector 407. Voice signals pass without attenuation through splitter-isolator 403 in a similar manner as that described in connection with the embodiment of FIG. 2. QAM line signals are converted into a digital form by the HPNA-2 AFE module 411 and then passed to second DSP 483 of the digital ADSL/HPNA-2 converter module 413, which, through signal processing, decodes the digital QAM signal. The decoded data may be stored in buffer RAM 489. First DSP 479 receives the information data, e.g. reads this data from RAM 489, and through digital signal processing converts this data to discrete DMT signals which are output through bus 461 to ADSL/HPNA-2 converter 413. Received DMT signals are converted by the ADSL AFE device 409 to analog DMT line signals.

An optional server computer 415 may be provided, coupled to control processor 491, through digital interface port 417. This computer server may provide a variety of different applications, similar to that described above in connection with FIG. 2.

Figure 4:
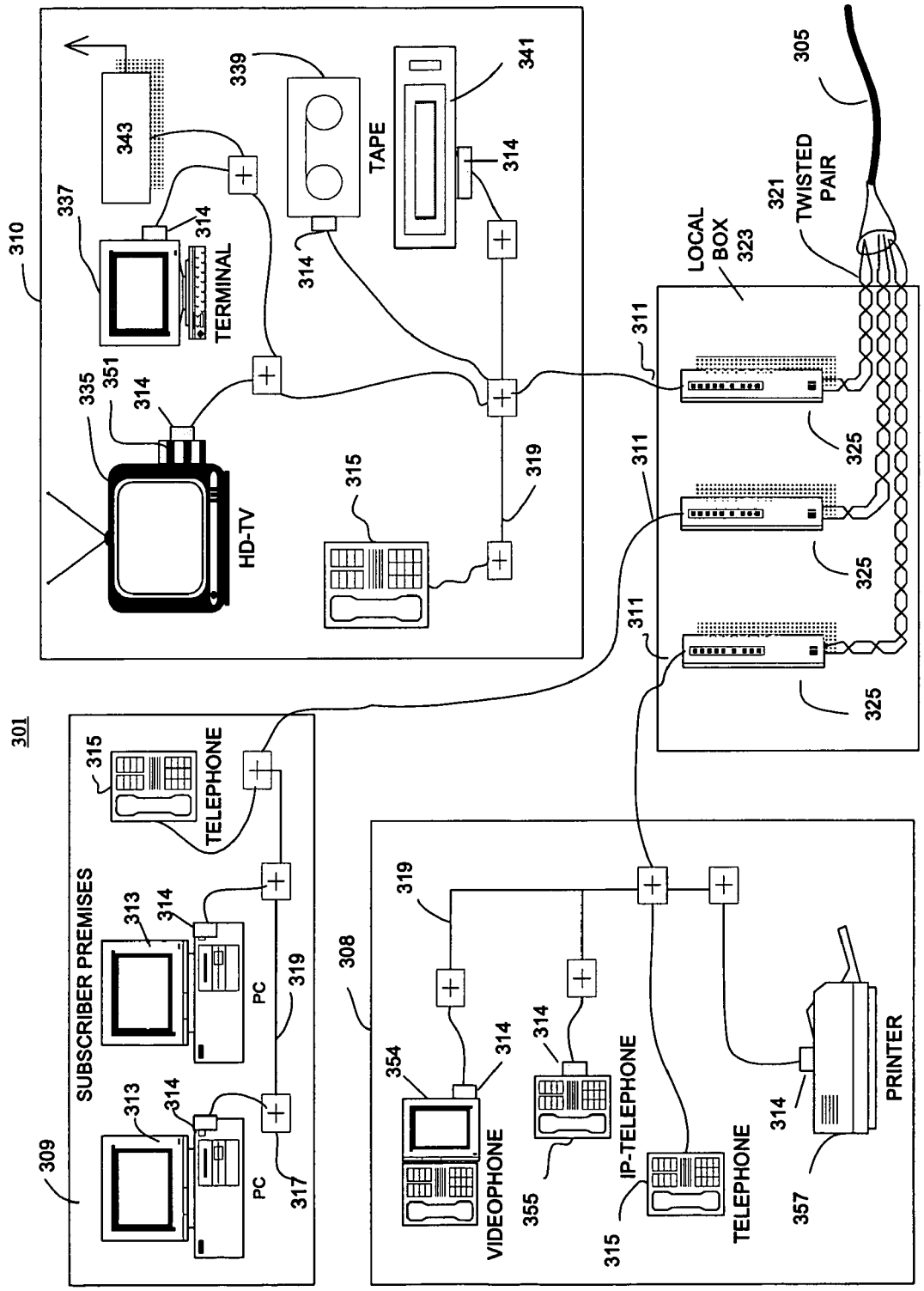
FIG. 4 is a schematic representation of a DSLCS in accordance with an embodiment of the invention.

Reference is now made to FIG. 4 showing a schematic representation of another embodiment of a DSLCS, generally designated 301 in accordance with an embodiment of the invention. A local box 323 comprising subscriber converters 325, of the kind shown in FIG. 3, receives twisted pair telephone cables 321 and is connected through intra-building wiring 311 to different subscriber premises 308, 309 and 310. As will be appreciated, although three subscriber premises are illustrated, this is an example only to illustrate some different types of subscriber network configurations within a subscriber premises. Subscriber premises 309 are similar to subscriber premises 109 shown in FIG. 1 with the same components designated by the same reference numerals, shifted by 200. The subscriber premises 308 comprise a video phone 354, an IP telephone 355, a regular telephone device 315 and a printer 357. Video phone 354 and IP telephone 355 are connected to telephone line 319 by HPNA-2 interface blocks 314, while telephone 315 is directly connected to line 319. The IP telephone 355, the videophone 354 and the telephone 315 may work simultaneously to provide three voice channels with the CO. There is essentially no limit to the number of IP telephones that may be connected to the subscriber line (typically more than 20 units). The videophone 354, may, in some embodiments of the invention, work in conjunction with the optional computer server 415, in which case, the video phone may support Internet service. Also included in subscriber premises 308 is printer 357 which is linked to line 319 also through an HPNA-2 interface 314 and may again operate in conjunction with the computer server 415.

Subscriber premises 310 comprises an HD-TV 335, a terminal device 337, a DVD device 341, a digital audio recorder 339, all connected to the telephone line by means of an HPNA-2 interface block 314. Also included in premises 310 is a common telephone 315, directly connected to line 319. Subscriber premises 310 further comprises a wireless set-top box 343 that may control different home devices and mechanisms by means of RF frequency.

The HD-TV 335 may receive video programs transmitted from the CO, and may also display video films transmitted from DVD device 341. The terminal device 337 is coupled to and works in conjunction with the computer server of the subscriber converter to replace a home PC and may be used for control of all devices connected to telephone line 319. As may be appreciated, the subscriber converter is continuously in operation and may be programmed by terminal device 337 to monitor other home devices and appliances through the wireless set-top box 343.

In a configuration of the type of premises 310, many services and applications may be obtained without the need for a home PC at the subscriber premises such as, for example, printing newsletters, electronic mail service, fax service, Internet service, and others.

Figure 5:
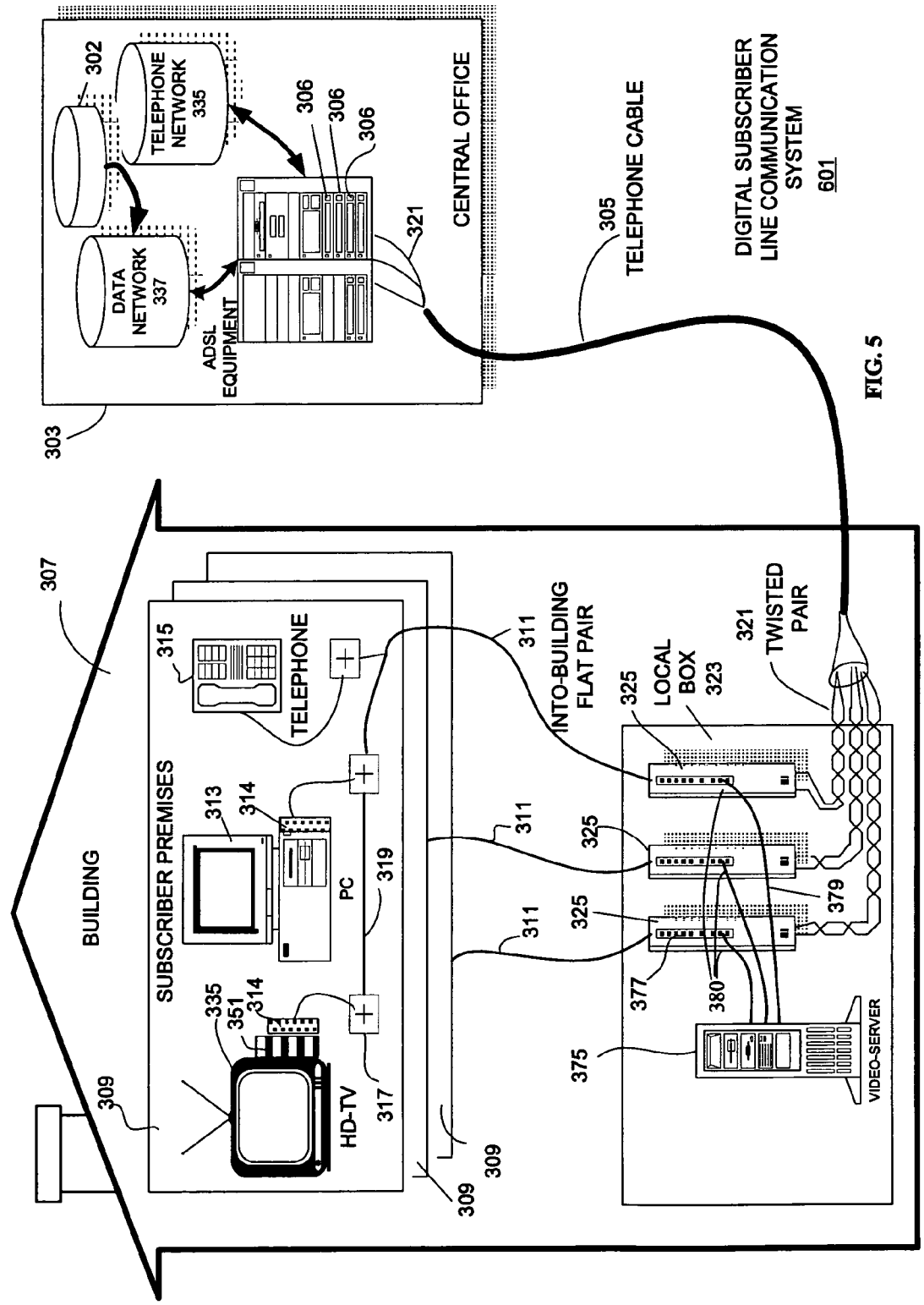
FIG. 5 is a schematic representation of another embodiment of a DSLCS of the invention.

A DSLCS 601 in accordance with another embodiment of the invention is shown schematically in FIG. 5. In this figure, like components to those of FIG. 1 were given like reference numerals shifted by 200, and the reader is referred to the description of FIG. 1 for an explanation of their nature and function. Building 307 of this embodiment comprises, within box 323, a video server 375 linked through interface cable 379 to interface ports 380 of subscriber converter 325. HD-TV set 335 comprises an MPEG decoder 351 and an HPNA-2 interface device 314, linked, through socket 317, to telephone line 319. Data network 337 is linked to a video-service provider 302. Video server 375 provides a video-on-demand service, a video-library service as well as other database services.

Figure 6:
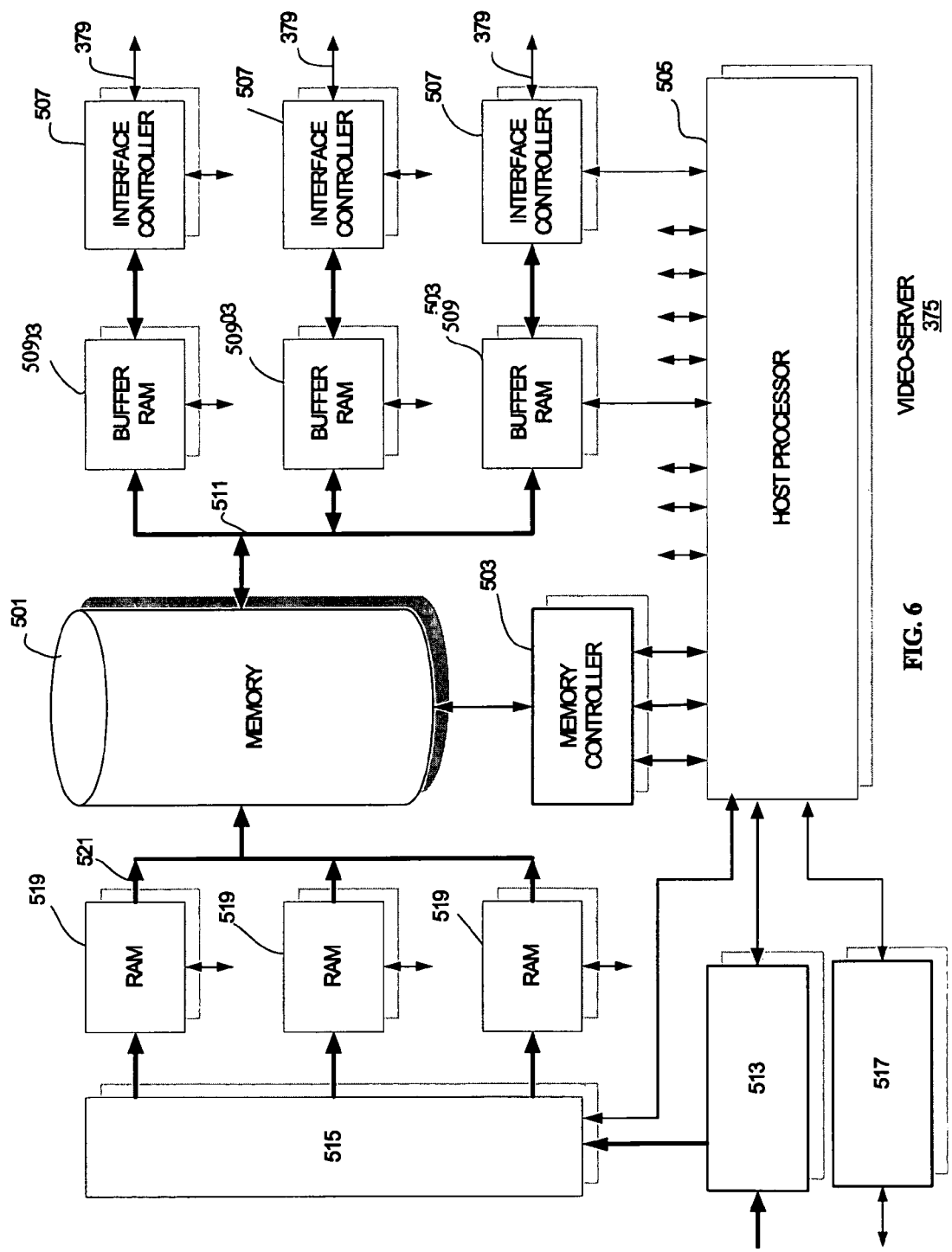
FIG. 6 is a block-diagram representation of a video server device in accordance with an embodiment of the invention.

One embodiment of a video server 375 is illustrated in block diagram format in FIG. 6. Video server 375 comprises a large size memory 501, coupled to a memory controller 503; a host processor 505; a plurality of subscriber channels, one for each subscriber converter, each comprising a buffer RAM 509 linked to memory 501 by means of bus 511, each buffer RAM being coupled to an interface controller 507 which is in turn connected to interface cable 379; high speed interface ports 513 and 517, both connected to a demultiplexer 515 and coupled to the host processor 505; and a plurality of RAMs 519, one for each subscriber converter, coupled to memory 501 by means of bus 521.

The host processor controls the different devices or modules of video server 375 and is controlled by a program which may be loaded from a floppy disk, from a CD ROM, etc., or from the CO, through the subscriber converters. The host processor may be directly coupled to devices within the subscriber converter for control of their operation, and may also communicate with the office xDSL modem at the CO. The host processor supports video-on-demand service and video library service for each of the customers linked to local box 323. The high speed ports 513 and 517 as well as the demultiplexer 515 are useful for a connection to external devices, as will be described below with reference to two applications, video-on-demand service and video-library service.

The DSLCS of FIG. 5 provides video-on-demand service, e.g. as described in the following. A customer may access computer server 415 either from a PC 313 or from a terminal device 337 and may order a video film, e.g. by sending to the host computer an Internet URL code. Video server 375 then establishes communication with video-provider 302. The video film may be transmitted by data packets with a bit rate, for example, of 1.5 Mb/s by using ADSL downstream communication protocol or at a higher rate by the use of VDSL protocols, as available. Each data packet includes an ID number that comprises information about the transmitted film and the serial number of the packet. The received data packet transmits through interface port 380 to video server 375. The interface controller 507 then writes the data packet into buffer RAM 509. The host processor reads the ID number of the data packet stored in each buffer RAM 503 and then writes the packet into memory 501 together with the ID numbers to eventually produce a video film file. After the end of the transmission, the host processor may insert the name of the file into a catalog and send a message to the customer. The film may then be accessed by the relevant subscribers. The film may be retrieved from the memory and then transmitted to HD-TV 335 through HPN interface 314 and decoder 351.

The loading of the film may conveniently be done during off-peak hours. As will be appreciated, memory 501 may be used for storage of data files other than video films. For example, each subscriber may assign a part of the memory for storing a backup for his PC as well as for any other data or programs.

Video library service may be realized in a similar manner. The video provider 302 may periodically send to a subscriber newly released films.

Figure 7:
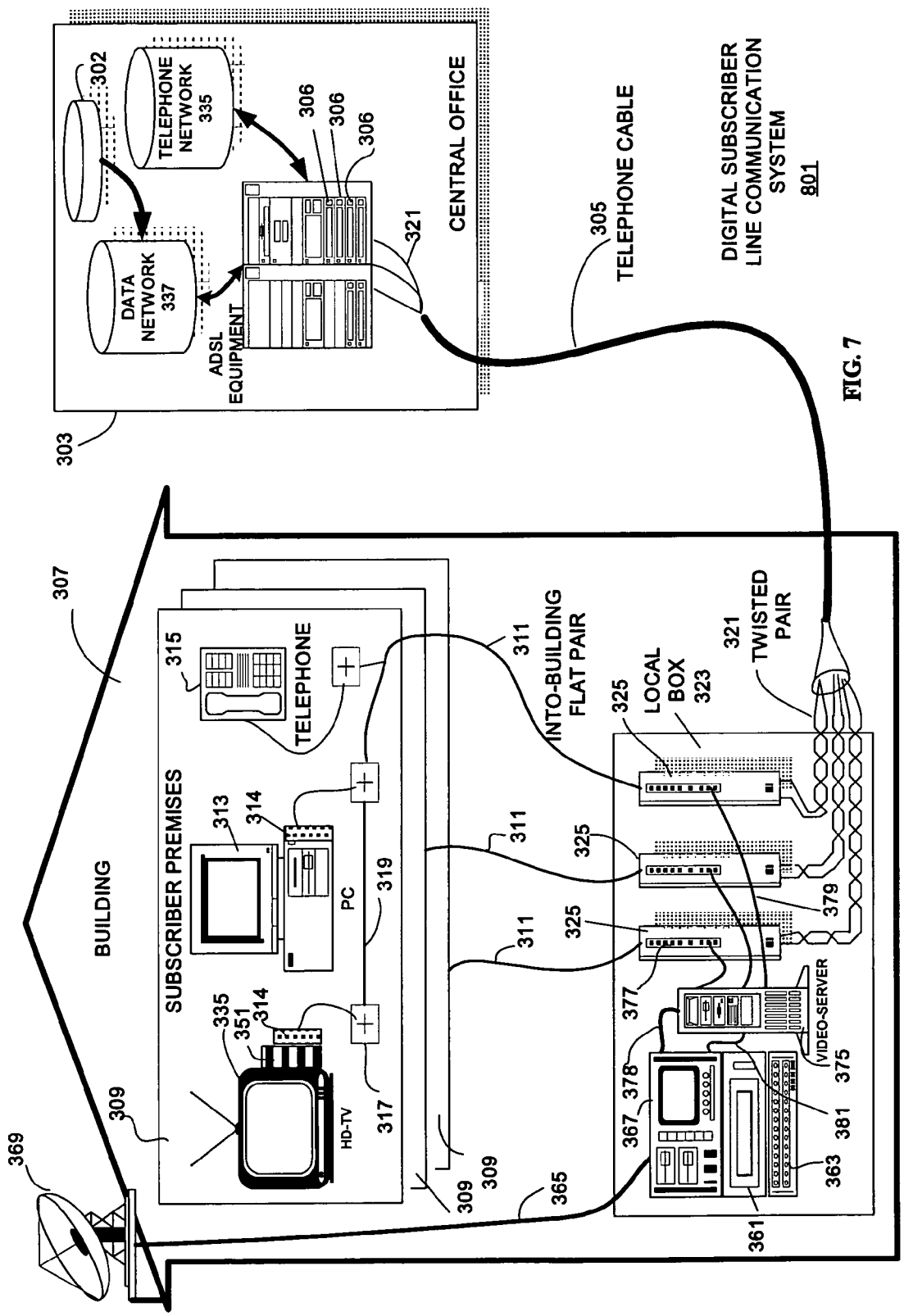
FIG. 7 is a schematic representation of a DSLCS in accordance with another embodiment of the invention.

FIG. 7 illustrates a DSLCS 801 in accordance with another embodiment of the invention. Most components of the system are the same as those of FIG. 5 and the reader is referred to the relevant description above for an understanding of their nature and function. A DSLCS 801 in accordance with this embodiment comprises a satellite antenna 369, typically placed on the building's roof, and connected by a coaxial cable 365 to a TV satellite receiver 367, placed inside the local box 323. Satellite receiver 367 is associated with an MPEG coder 361 and a multiplexer 363, connected to video server 375 by means of a coaxial cable 378. An interface cable 381 connects receiver 367 to an interface port of video server 375. In this embodiment, the customer has the choice of ordering a broadcast, a video, etc., through satellite communication in addition to his ability to obtain such service through the CO 303. Furthermore, satellite communication may also be used in this embodiment for a variety of other services including, for example, Internet services.

Figure 8:
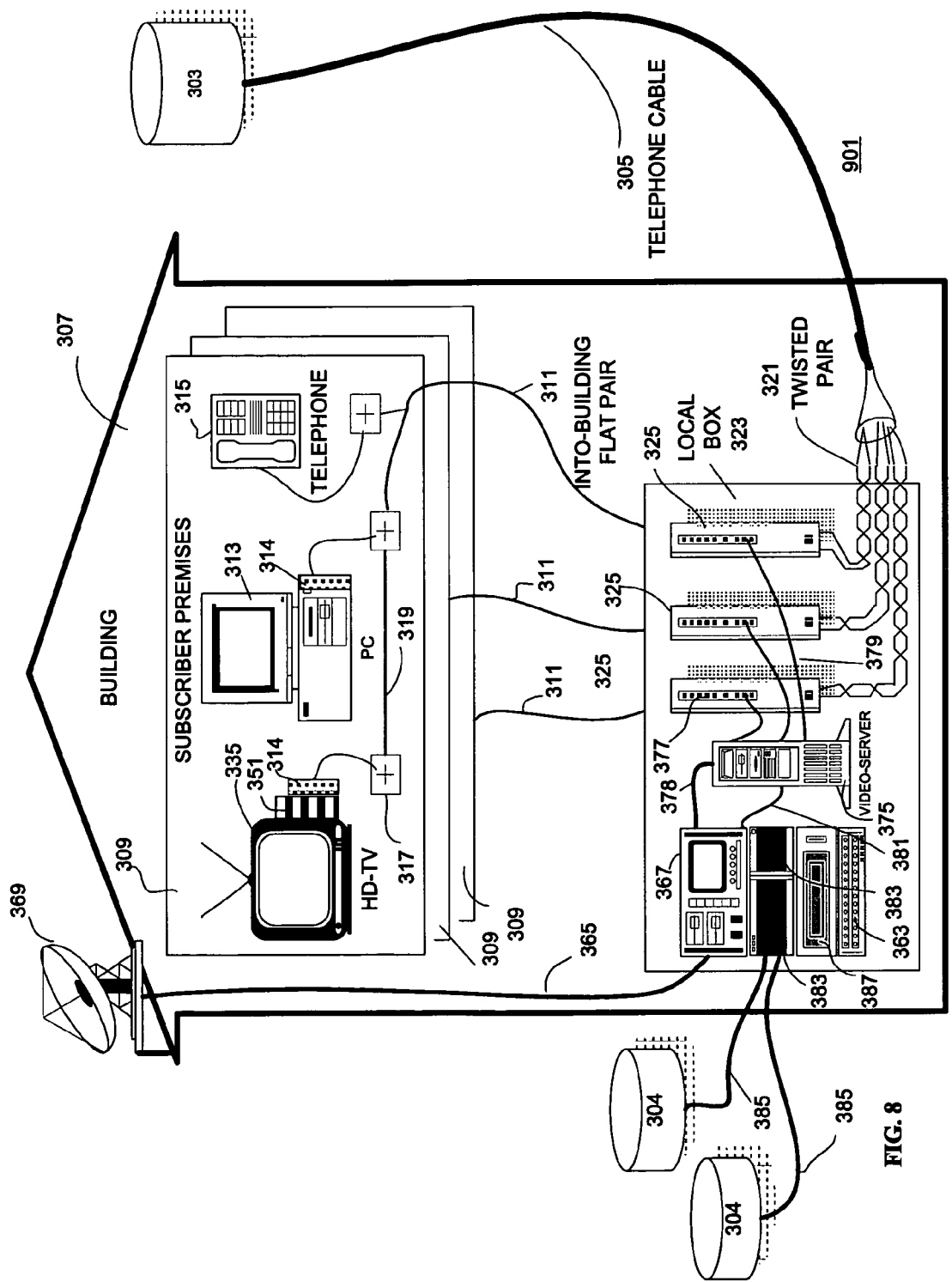
FIG. 8 is a schematic representation of a DSLCS in accordance with another embodiment of the invention.

FIG. 8 illustrates a DSLCS 901 in accordance with another embodiment of the invention, which additionally supports also cable TV. In this figure, like components to those of FIG. 7 have been given like reference numerals and the reader is referred to the description above for an explanation of their nature and function.

A cable TV receiver 383 is included within local box 323 and is connected to different cable TV providers 304, typically by coaxial cables 385. Each cable TV receiver 383 is connected to a multi-channel MPEG coder 387 which is, in turn, linked to multiplexer 363, connected to video server 375. The system 901 provides data in both services from the CO, TV satellite broadcast services and cable TV service, all of which can be accessed by the customer through his HD-TV television set 335 with its associated decoder 351 and HPN interface block 314.

Figure 9:
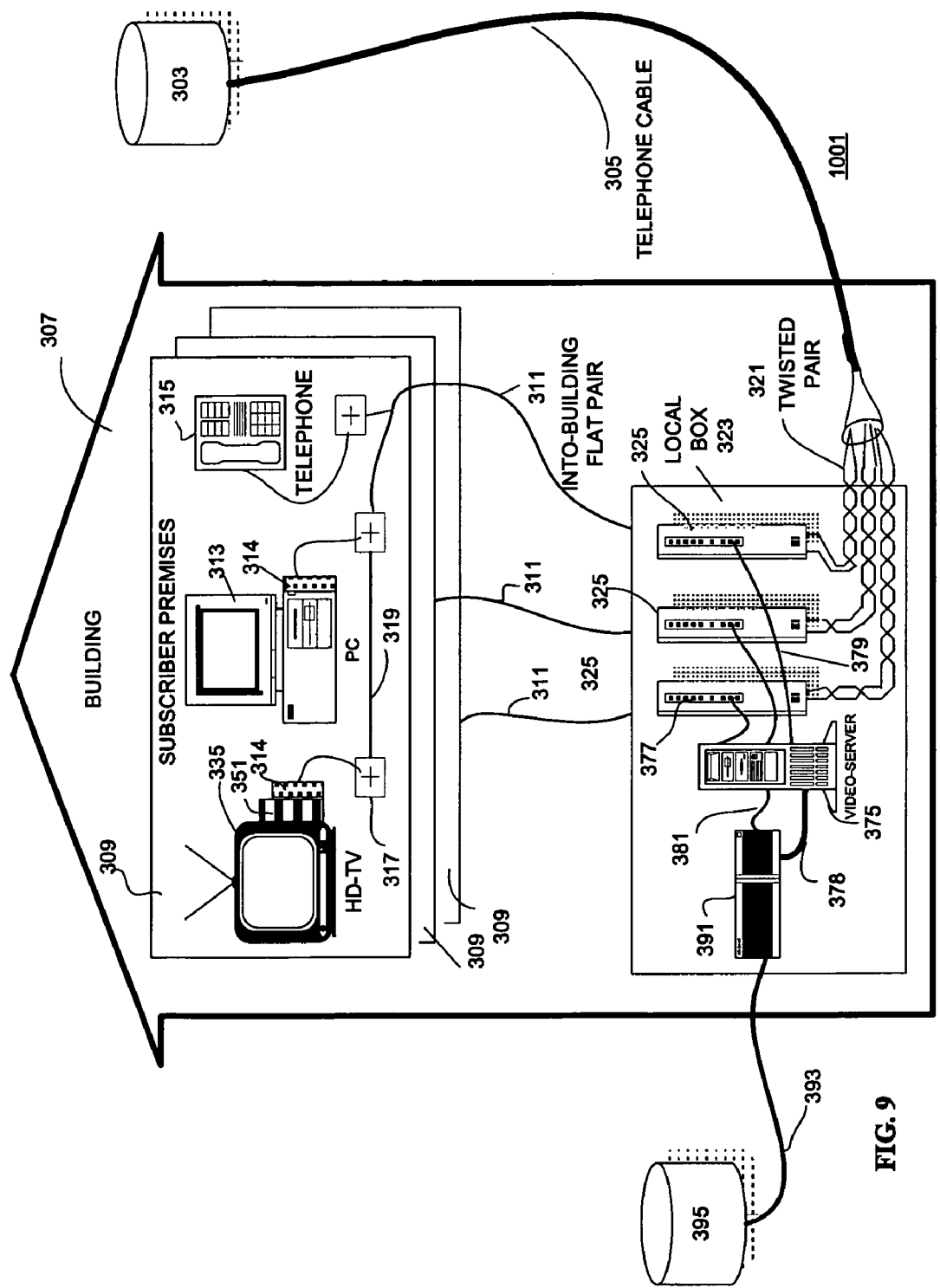
FIG. 9 is a schematic representation of a DSLCS in accordance with another embodiment of the invention.

Another embodiment of a DSLCS of the invention is shown in FIG. 9. System 1001 of this embodiment includes various components included in embodiments described above and the reader is referred to the above description for an explanation of their nature and function. In the system of embodiment 1001, included in local box 323 is a fiber optical receiver 391 connected via an optical cable 393 to a high speed data service provider 395 and through high speed data link 378 to a high speed interface port of video server 375. In order to realize high speed data service, HPN blocks 314 will be of the high speed (100 Mb/s or higher) HPNA-3 interface devices. A fiber cable, as known, may support a bit rate of up to about 155 Mb/s.

As will be appreciated, the specific embodiments described herein are merely examples and a large number of changes, or variations are possible, all being clear to the man of the art, all encompassed within the invention as defined herein. The above description is thus an illustration of the full scope of the invention and is not intended to be limiting.

What is claimed is:

1. A communication device comprising:
    an analog splitter-isolator connectable between to-building wiring and in-building telephone wiring to a subscriber premises which permits passage therethrough only of analog POTS signals and blocks passage of xDSL and HPNA analog signals between an external xDSL telephone data network and an internal HPNA telephone data network;
    an xDSL analog front end (AFE) module connectable at one end of said splitter-isolator for communication with said external xDSL network;
    an HPNA AFE connectable to a second end of said splitter-isolator to provide only analog HPNA signals along said in-building wiring to provide said internal HPNA network for said premises; and
    an xDSL-to-HPNA converter connected between said xDSL AFE and said HPNA AFE to pass digital data between said external xDSL network and said internal HPNA network.

2. A device according to claim 1 wherein said to-building wiring is twisted pair wiring.

3. A device according to claim 1 wherein said in-building wiring is flat pair wiring.

4. A device according to claim 1 and wherein said HPNA AFE is operative to communicate with at least one terminal device in said subscriber premises.

5. A device according to claim 4, wherein said at least one terminal device is selected from the group consisting of a personal computer (PC), a video device, a television set, a videophone, an IP-phone and a HI-FI audio device.

6. A device according to claim 1 and also comprising an input/output port connectable to a video server.

7. A communication device according to claim 1, wherein said splitter-isolator comprises a high-pass filter connected to said to-building telephone wiring, a HPN line transformer connected to said in-building telephone wiring, and a low-pass filter connecting said high pass filter and said HPN line transformer.

8. A method for communication comprising:
    having an internal HPNA telephone data network in a subscriber premises;
    an analog splitter-isolator passing only low frequency analog POTS signals between said internal HPNA telephone data network and an external xDSL telephone data network; and
    an xDSL-to-HPNA converter passing only digital data from xDSL and HPNA high frequency analog telephone signals between said two networks and said analog splitter-isolator blocking passage of said high frequency analog telephone signals between said external xDSL network and said internal HPNA telephone data network.

9. A method according to claim 8 and also comprising receiving and storing video films or broadcast transmitted from a central office (CO) and transmitting said downloaded video films or broadcast to said subscriber premises along said internal data network.

10. A communication device for providing voice and data services to a subscriber premises within a building using in-building wiring for an internal HPNA network and to-building wiring for an external xDSL network, the device comprising:
    an analog splitter-isolator having a first connector connected to said to-building telephone wiring and a second connector connected to said in-building telephone wiring, said splitter-isolator filtering off high frequency xDSL and HPNA analog telephone signals and passing only low frequency analog POTS signals between said first and second connectors; and a converter connected in parallel to said splitter-isolator via said first and second connectors, wherein said converter receives high frequency telephone analog telephone signals of said internal HPNA network and of said external xDSL network from said splitter-isolator and passes only digital data between said internal HPNA network and said external xDSL network without passing said high frequency analog telephone signals.

11. A communication device according to claim 10, wherein said splitter-isolator comprises a high-pass filter connected to said first connector, a HPN line transformer connected to said second connector, and a low-pass filter connecting said high pass filter and said HPN line transformer.

* * * * *